United States Patent
Matsunaga

(10) Patent No.: US 10,638,058 B2
(45) Date of Patent: Apr. 28, 2020

(54) IMAGING DEVICE, IMAGING METHOD AND STORAGE MEDIUM

(71) Applicant: Olympus Corporation, Hachioji-shi, Tokyo (JP)

(72) Inventor: Takuya Matsunaga, Akiruno (JP)

(73) Assignee: Olympus Corporation, Tokyo (JP)

( * ) Notice: Subject to any disclaimer, the term of this patent is extended or adjusted under 35 U.S.C. 154(b) by 10 days.

(21) Appl. No.: 16/058,848

(22) Filed: Aug. 8, 2018

(65) Prior Publication Data

US 2019/0089908 A1 Mar. 21, 2019

(30) Foreign Application Priority Data

Sep. 15, 2017 (JP) ................... 2017-178280

(51) Int. Cl.
  *H04N 5/265* (2006.01)
  *H04N 5/232* (2006.01)
  *H04N 7/01* (2006.01)
  *H04N 5/268* (2006.01)

(52) U.S. Cl.
  CPC ......... *H04N 5/265* (2013.01); *H04N 5/23293* (2013.01); *H04N 5/232127* (2018.08); *H04N 5/232133* (2018.08); *H04N 5/268* (2013.01); *H04N 7/0127* (2013.01)

(58) Field of Classification Search
  CPC .... H04N 5/265; H04N 5/268; H04N 5/23293; H04N 5/232127; H04N 7/0127; H04N 5/232133
  See application file for complete search history.

(56) References Cited

U.S. PATENT DOCUMENTS

| 2009/0086074 A1* | 4/2009 | Li | H04N 5/23245 348/308 |
| 2010/0165152 A1* | 7/2010 | Lim | G06T 5/50 348/240.99 |
| 2011/0176028 A1* | 7/2011 | Toyoda | H04N 5/2353 348/223.1 |
| 2012/0081579 A1* | 4/2012 | Doepke | H04N 5/2355 348/231.99 |

(Continued)

FOREIGN PATENT DOCUMENTS

JP 2001-298755 10/2001

*Primary Examiner* — Abdelaaziz Tissire
(74) *Attorney, Agent, or Firm* — John C. Pokotylo; Pokotylo Patent Services

(57) ABSTRACT

An imaging device, comprising an image sensor that forms a subject image to acquire an image, an image processing circuit that generates an image for display from images that have been acquired by the image sensor, an image combining circuit that generates a combined image for display that has a deeper depth of field than the image for display, from a plurality of images for combination that have been acquired by the image sensor at respectively different in focus positions, an in focus position setting section that sets in focus position, a shooting information acquisition section that acquires information on shooting conditions, and a display image determination section that determines whether to display either the image for display or the combined image for display as a display image, and a display that displays the display image that has been determined by the display image determination section.

17 Claims, 8 Drawing Sheets

| INFORMATION ACQUIRED | COMBINED IMAGE DISPLAY STOPPED | | COMBINED IMAGE DISPLAY STARTED |
|---|---|---|---|
| | SMALL CHANGE | LARGE CHANGE | |
| BRIGHTNESS | DO NOT SWITCH | SWITCH | AFTER BECOMING STABLE |
| LIGHT SOURCE COLOR | DO NOT SWITCH | SWITCH | AFTER BECOMING STABLE |
| SUBJECT MOVEMENT | DO NOT SWITCH | SWITCH | AFTER BECOMING STABLE |
| HAND SHAKE | DO NOT SWITCH | SWITCH | AFTER BECOMING STABLE |
| FOCUS POSITION | SWITCH | SWITCH | IMMEDIATELY |
| FOCAL LENGTH | SWITCH | SWITCH | IMMEDIATELY |
| PHOTOGRAPHER INSTRUCTION | SWITCH | SWITCH | IMMEDIATELY |

(56) References Cited

U.S. PATENT DOCUMENTS

2013/0176458 A1\* 7/2013 Van Dalen ............. H04N 5/232
 348/231.99
2015/0326798 A1\* 11/2015 Muto ................. H04N 5/23229
 348/239
2016/0119534 A1\* 4/2016 Han ....................... H04N 5/232
 348/345

\* cited by examiner

FIG. 4

| INFORMATION ACQUIRED | COMBINED IMAGE DISPLAY STOPPED | | COMBINED IMAGE DISPLAY STARTED |
|---|---|---|---|
| | SMALL CHANGE | LARGE CHANGE | |
| BRIGHTNESS | DO NOT SWITCH | SWITCH | AFTER BECOMING STABLE |
| LIGHT SOURCE COLOR | DO NOT SWITCH | SWITCH | AFTER BECOMING STABLE |
| SUBJECT MOVEMENT | DO NOT SWITCH | SWITCH | AFTER BECOMING STABLE |
| HAND SHAKE | DO NOT SWITCH | SWITCH | AFTER BECOMING STABLE |
| FOCUS POSITION | SWITCH | SWITCH | IMMEDIATELY |
| FOCAL LENGTH | SWITCH | SWITCH | IMMEDIATELY |
| PHOTOGRAPHER INSTRUCTION | SWITCH | SWITCH | IMMEDIATELY |

IMAGING DEVICE, IMAGING METHOD AND STORAGE MEDIUM

CROSS-REFERENCE TO RELATED APPLICATIONS

Benefit is claimed, under 35 U.S.C. § 119, to the filing date of prior Japanese Patent Application No. 2017-178280 filed on Sep. 15, 2017. This application is expressly incorporated herein by reference. The scope of the present invention is not limited to any requirements of the specific embodiments described in the application.

BACKGROUND OF THE INVENTION

1. Field of the Invention

The present invention relates to an imaging device an imaging method, and storage medium for acquiring a plurality of image data while changing focus position, and combining the plurality of image data.

2. Description of the Related Art

Taking a photograph that is in focus at all focus positions is difficult. Therefore, after having acquired image data by shooting at an initial focus position, image data is acquired by moving the focus position and performing shooting again. Then, by repeating this operation it is possible to acquire a plurality of image data. It has been proposed to display image data that is in focus over a wide range of subject distance by combining this plurality of image data that have been acquired (refer, for example, to Japanese patent laid-open No. 2001-298755 (hereafter referred to as "patent publication 1")). It should be noted that this combination processing is called focus stacking processing.

By using the technology proposed in patent publication 1 described above, it is possible to identify how deep a subject depth of field is. However, not only with focus stacking processing, since processing time becomes long in a case where a plurality of images are combined, if a combined image is displayed at the time of live view display a refresh interval becomes long, and framing (compositional setting) is difficult. If it is possible to display an image that has been subjected to focus stacking processing it is possible for a user to confirm an in-focus range by setting focus stacking mode, which is convenient, but if refresh interval becomes long an image for observation cannot be tracked in accordance with framing changes, and it is difficult to use.

SUMMARY OF THE INVENTION

The present invention provides an imaging device, imaging method and storage medium in which confirmation of both framing and extended effect for depth of field are achieved.

An imaging device of a first aspect of the present invention comprises an image sensor that images a subject to acquire an images, an image processing circuit that generates an image for display using the images that have been acquired by the image sensor, an image combining circuit that generates a combined image for display that has a deeper depth of field than the image for display, from a plurality of images for combination that have been acquired by the image sensor are respectively different in focus positions, a processor having an in focus position setting section, a shooting information acquisition section and a display image determination section, the in focus position setting section setting in focus position, the shooting information acquisition section acquiring information on shooting conditions and the display image determination section determining whether to display either the image for display or the combined image for display as a display image, and a display that displays the display image that has been determined by the display image determination section, wherein the image combining circuit generates a combined image for display using a plurality of images for combination that have been acquired at a plurality of in focus positions that have been set by the in focus position setting section, and the display image determination section determines the display image to be displayed on the display using at least one of items of information among brightness, light source color, subject movement, and blur amount, focus position, focal length, and photographer instruction acquired by the shooting information acquisition section.

An imaging method of a second aspect of the present invention comprises imaging a subject and acquiring images, generating an image for display from the images that have been acquired, setting in focus position, generating a combined image for display that has a deeper depth of field than the image for display from a plurality of images for combination that have been acquired at a plurality of respectively different in focus positions that have been set, acquiring information on shooting conditions, determining whether to make either the image for display or the combined image for display a display image that is displayed, displaying the display image that has been determined on a display, and in determining the display image, determining the display image that is displayed on the display using at least one of items of information among brightness, light source color, subject movement, and blur amount, focus position, focal length and photographer instruction acquired as the shooting conditions that have been acquired.

A non-transitory computer-readable medium of a third aspect of the present invention, storing a processor executable code, which when executed by at least one processor, performs an imaging method, the imaging method comprising imaging a subject and acquiring images, generating an image for display from the images that have been acquired, setting in focus position, generating a combined image for display that has a deeper depth of field than the image for display from a plurality of images for combination that have been acquired at a plurality of respectively different in focus positions that have been set, acquiring information on shooting conditions, determining whether to make either the image for display or the combined image for display a display image that is displayed, displaying the display image that has been determined on a display, and in determining the display image, determining the display image that is displayed on the display using at least one of items of information among brightness, light source color, subject movement, and blur amount, focus position, focal length and photographer instruction acquired as the shooting conditions that have been acquired.

BRIEF DESCRIPTION OF THE DRAWINGS

FIG. 4 is a table showing information acquired by the shooting information acquisition section and determination in a display image determination section, in the camera of one embodiment of the present invention.

DETAILED DESCRIPTION OF THE PREFERRED EMBODIMENTS

An example that has been applied to an imaging device (hereafter a digital camera will be specifically referred to as a "camera"), as one embodiment of the present invention, will be described in the following. This camera has an imaging section, with a subject image being converted to image data by this imaging section, and the subject image being subjected to live view display on a display section arranged on the rear surface of a main body based on this converted image data. A photographer determines composition and photo opportunity by looking at the live view display. At the time of a release operation image data is stored in a storage medium. Also, image data that has been stored in the storage medium can be subjected to playback display on the display section if playback mode is selected.

Figure 2:
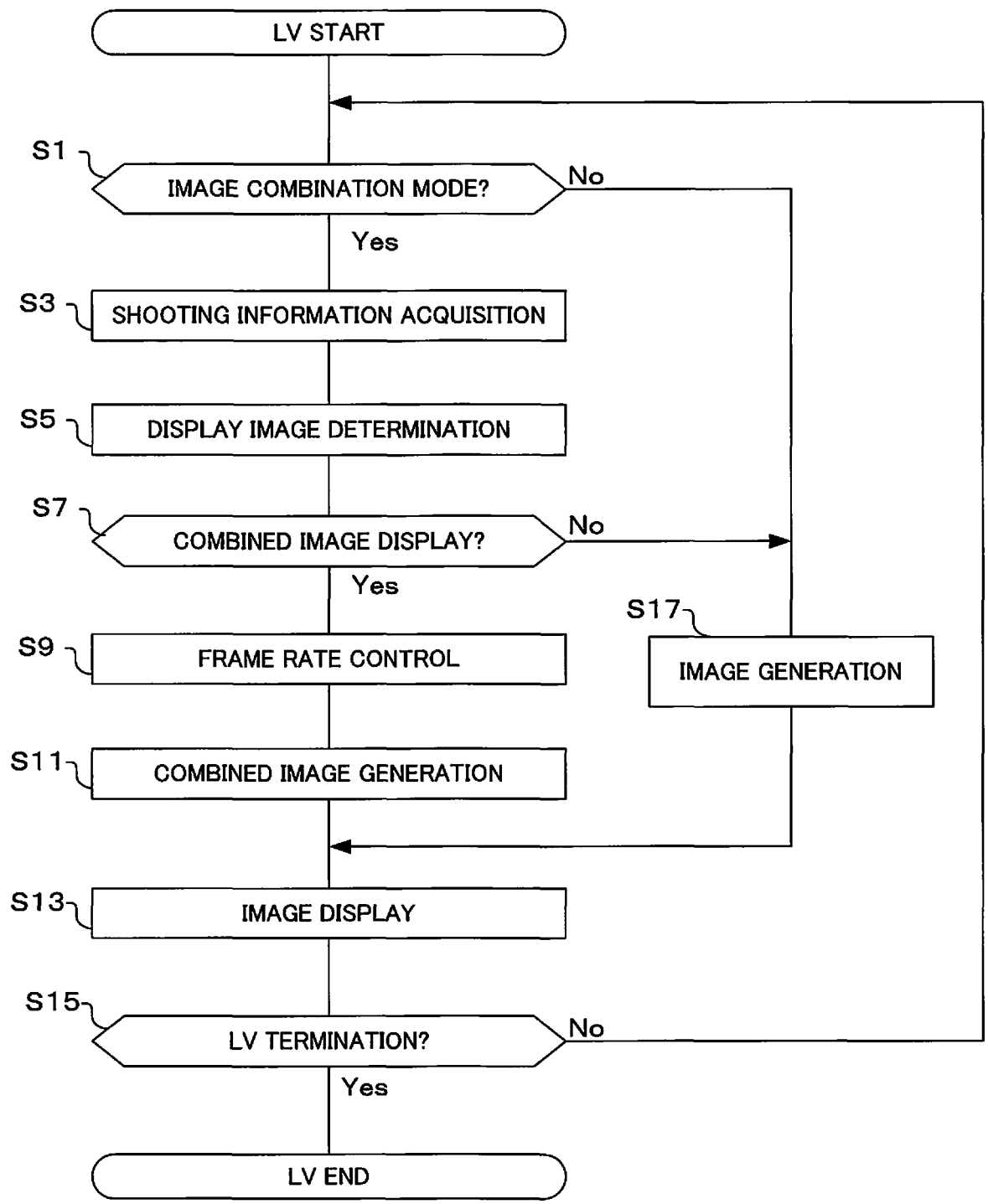
FIG. 2 is a flowchart showing operation for live view (LV) in the camera of one embodiment of the present invention.

Also, in a case where focus stacking mode is set during live view display, and focus stacking display mode is set, it is determined whether to display or not display a focus stacked image in accordance with shooting conditions information (refer to S7 in FIG. 2). If the result of this determination is to display a focus stacked image, a focus position of a photographing lens is sequentially moved, and image data for focus stacking is acquired (refer to S9 and S11 in FIG. 2). On the other hand, if the result of determination is to not display the focus stacked image, image data of a single frame is acquired, and a normal live view image is displayed (refer to S17 in FIG. 2).

Figure 1:
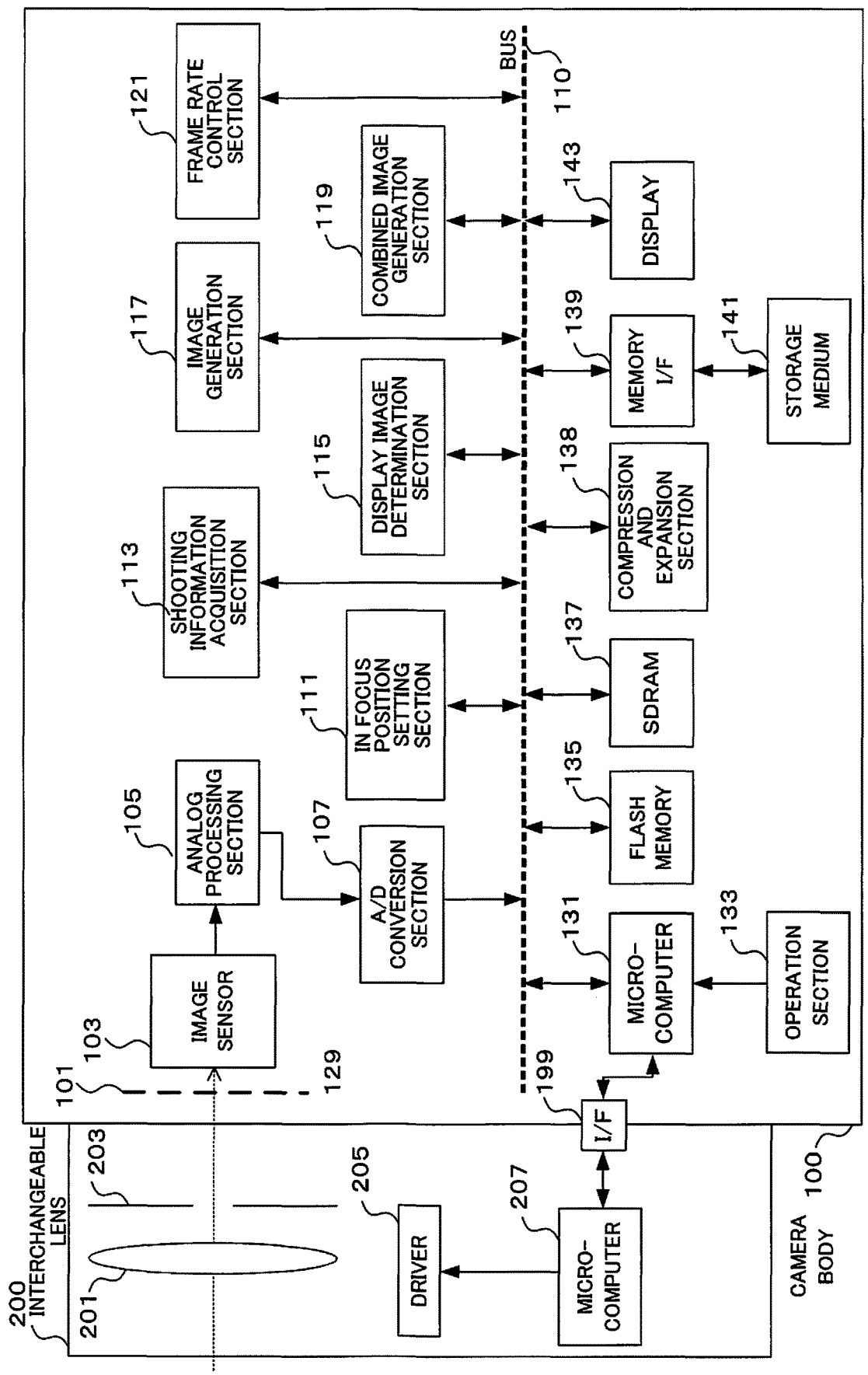
FIG. 1 is a block diagram mainly showing the electrical structure of a camera of one embodiment of the present invention.

FIG. 1 is a block diagram mainly showing the electrical structure of a camera of one embodiment of the present invention. This camera comprises a camera body 100 and an interchangeable lens 200 that can be attached to and removed from the camera body 100. With this embodiment, a photographing lens is an interchangeable lens, but this is not limiting, and it is also possible to have a digital camera of a type where a photographing lens is fixed to the camera body.

The interchangeable lens 200 is made up of a photographing lens 201, an aperture 203, a driver 205, and a microcomputer 207, and has an interface (hereafter referred to as I/F) 199 between the interchangeable lens 200 and the camera body 100, which will be described later.

The photographing lens 201 is constituted by a plurality of optical lenses (including a focus lens for focus adjustment) for forming a subject image, and is a fixed focal length lens or a zoom lens. The aperture 203 is arranged at the rear of the optical axis of this photographing lens 201. This aperture 203 has a variable opening diameter, and control light amount of subject light flux that has passed through the photographing lens 201.

It is also possible to move the photographing lens 201 in the optical axis direction using the driver 205. The driver 205 can move the focus lens within the photographing lens 201 based on control signals from the microcomputer 207, and in this way focus position is controlled. Also, in the case of a zoom lens, focal length may be controlled using the driver 205. The driver 205 also controls opening diameter of the aperture 203. The driver 205 has a circuit for drive of the photographing lens 201, and a circuit for drive of the aperture 203.

The microcomputer 207 that is connected to the driver 205 is connected to the I/F 199. The microcomputer 207 operates in accordance with a program stored in the flash memory (not illustrated) provided within the interchangeable lens 200, to perform communication with a microcomputer 131 within the camera body 100, which will be described later, and perform control of the interchangeable lens 200 based on control signals from the microcomputer 131.

The microcomputer 207 acquires focus position of the focus lens from a position detector (not shown), and acquires zoom position of the zoom lens from a position detector (not shown). The acquired focus position and zoom position are transmitted to the microcomputer 131 within the camera body 100.

Inside the camera body 100, a mechanical shutter 101 is arranged on the optical axis of the photographing lens 201. This mechanical shutter 101 controls the time for which subject light flux passes, and a well-known focal plane shutter or the like is adopted, for example. Behind this mechanical shutter 101, an image sensor 103 is arranged, at a position where the subject image is formed by the photographing lens 201.

The image sensor 103 has photo diodes constituting each pixel in a two dimensional matrix shape. Photoelectric conversion current is generated in each photodiode in accordance with received light amount, and this photoelectric conversion current is the subject of charge storage by a capacitor connected to each photodiode. A Bayer array RGB filter is arranged on the front surface of each pixel. The image sensor 103 also has an electronic shutter. This electronic shutter carries out control of exposure time by controlling the time from charge storage until charge readout of the image sensor 103. The image sensor 103 is not limited to a Bayer array, and a layered type such as Foveon (Registered trademark), for example, can also be used. The image sensor 103 functions as an image sensor for acquiring images by imaging a subject.

The image sensor 103 is connected to an analog processing section 105. This analog processing section 105 has an analog processing circuit, and performs various analog processing on photoelectric conversion signals (analog image signal) that have been read out from the image sensor 103. As analog processing, for example, wave shaping is performed on a signal after ensuring that reset noise etc. has been reduced, and further gain increase is performed so as to achieve appropriate brightness.

The analog processing section 105 is connected to an A/D conversion section 107. This A/D conversion section 107 has an A/D conversion circuit, and performs analog to digital conversion of the analog image signals, and outputs the digital image signals (hereafter referred to as image data) to a bus 110.

The bus 110 is a transfer path for transferring various data, that has been read out or generated inside the camera body 100, within the camera body 100. Besides being connected to the previously described A/D conversion section 107, the bus 110 is connected to an in focus position setting section 111, a shooting information acquisition section 113, a display image determination section 115, an image generating section 117, a combined image generating section 119, a frame rate control section 121, the microcomputer 131, a flash memory 135, SDRAM 137, a compression and expansion section 138, a memory interface (hereafter referred to as a memory I/F) 139, and a display section 143.

The in focus position setting section 111 includes a processor (setting circuit) for setting a plurality of focus lens positions, and the microcomputer 131 implements functions of the in focus position setting section 111. In the event that focus stacking mode has been set, the in focus position setting section 111 sequentially moves the photographing lens 201 to a plurality of positions of order to acquire images for focus stacking (refer, to S11 in FIG. 2). This in focus position is made a different position for when an image for storage is acquired and when an image for display is acquired. Setting of in focus position by the in focus position setting section 111 will be described later using FIG. 3. The in focus position setting section 111 functions as an in focus position setting section that sets in focus position. The in focus position setting section 111 also functions as a focus position setting section that sets a plurality of focus positions.

The shooting information acquisition section 113 includes a processor (acquisition circuit) for acquiring shooting information, and the microcomputer 131 may implement functions of the shooting information acquisition section 113. In the event that focus stacking mode is set at the time of live view display and focus stacking display mode is set, the shooting information acquisition section 113 acquires shooting information (shooting condition information) that is used when determining whether to display an image that has been subjected to focus stacking or to display a normal live view display (refer to S3 in FIG. 2). As shooting information acquired by the shooting information acquisition section 113 there is, for example, information relating to various shooting conditions, such as brightness, subject color, light source color, subject movement, hand shake or device shake, focus position, focal length and photographer instruction etc. Among these items of information, brightness, subject color, light source color and subject movement are preferably detected by analyzing image data. For information on hand shake or device shake output values of a shake detection sensor may be acquired, and for focus position and focal length lens setting values may be acquired. Photographer instruction is input by means of an operating section 133, and so it is only necessary to acquire information of the operation section 133. Hand shake is caused by vibration such as vibration of the photographer or vibration of an operator conveyed to the imaging device, that causes shaking. In cases where the imaging device is mounted on a base, or where the imaging device is fixed, device shake is caused by vibration due to the effect of vibration being conveyed from outside, and is also vibration that is caused by operation of mechanisms within the imaging device. The shooting information acquisition section 113 functions as a shooting information acquisition section that acquires information on shooting conditions.

The display image determination section 115 includes a processor for determining display image (determination circuit), and the microcomputer 131 may implement functions of the display image determination section 115. The display image determination section 115 determines which of a normal live view image that has been generated by the image generating section 117, or a focus stacked image that has been generated by the combined image generating section 119, will be displayed on the display section 143, using current information and previous information that has been acquired by the shooting information acquisition section 113 (refer to S5 and S7 in FIG. 2). This determination is performed using previous information and current information that has been acquired by the shooting information acquisition section 113, and a threshold value that has been set in advance (refer to FIG. 4, FIG. 5 etc.). Also, the threshold value used in the determination may be changed in accordance with shooting magnification.

The display image determination section 115 functions as a display image determination section that determines which of either an image for display or a combined image for display is displayed as a display image. This display image determination section determines the display image to be displayed on the display using at least one of items of information among brightness, light source color, subject movement, hand shake amount or device shake amount, focus position, focal length and photographer instruction acquired by the shooting information acquisition section (refer, for example, to S5 and S7 in FIG. 2). Also, the display image determination section 115 functions as an display image determination section that determines which of either an image for display or a combined image for display is made a display image for displaying an image based on shooting condition that have been acquired by the shooting information acquisition section (refer, for example, to S5 and S7 in FIG. 2). The above described brightness and light source color are examples of shooting information acquired by the shooting information section, and shooting information may be information other than those items of information.

Figure 5:
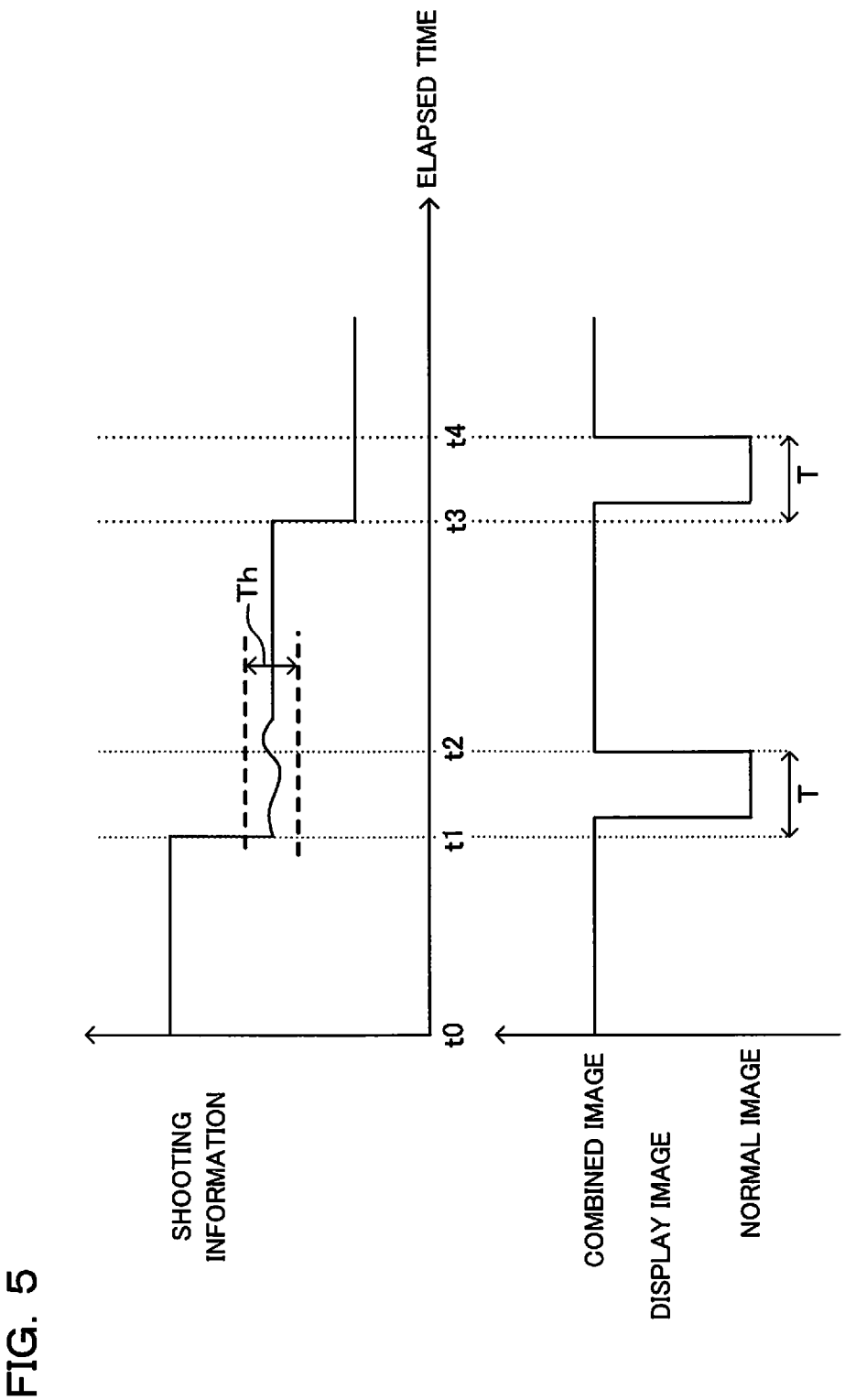
FIG. 5 is a graph showing shooting condition change and determination of display image, in the camera of one embodiment of the present invention.

Also, the display image determination section determines an image to be displayed on the display by comparing change amount in previous and current information, of information that has been acquired by the shooting information acquisition section, with a threshold value (referred to FIG. 4 and FIG. 5). The display image determination section also changes the threshold value in accordance with shooting magnification at the time of shooting (refer, for example, to FIG. 3 and FIG. 4). Also, the display image determination section changes timing for switching a display image from the image for display to the combined image for display in accordance with a type of information for which information change amount has exceeded the threshold value (refer, for example to FIG. 4).

Figure 7A:
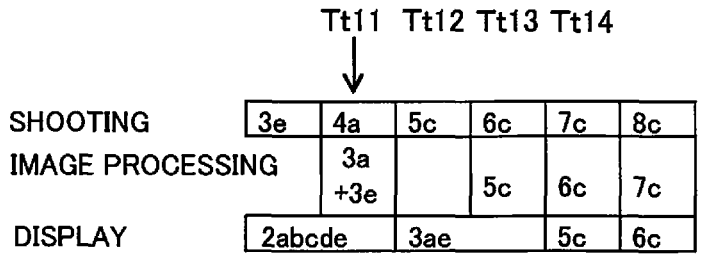
FIG. 7A to FIG. 7C are drawings showing a modified example of a display image after designation of display termination for a focus stacking image, in the camera of one embodiment of the present invention.
Figure 7B:
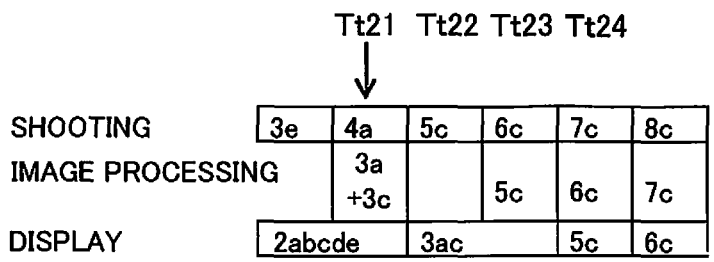

Also, in a case of switching the display image from the combined image for display to the image for display, and if the combined image generating section has completed combination of at least two images from among images for combination, the above described display image determination section determines a combined image during combination as a display image, and after this image has been displayed on the display determines an image for display as a display image and switches so as to display this image on the display (refer, for example, to FIG. 7B).

Also, in a case where the above mentioned display image determination section switches the display image from the combined image for display to the image for display, if the combined image generating section has completed combination of focus positions for both ends set by the in focus position setting section, from among images for combination, the display image determination section determines a combined image during combination as the display image, and after this image has been displayed on the display determines an image for display as a display image, and switches so as to display this image on the display (refer, for example, to FIG. 7A).

Figure 7C:
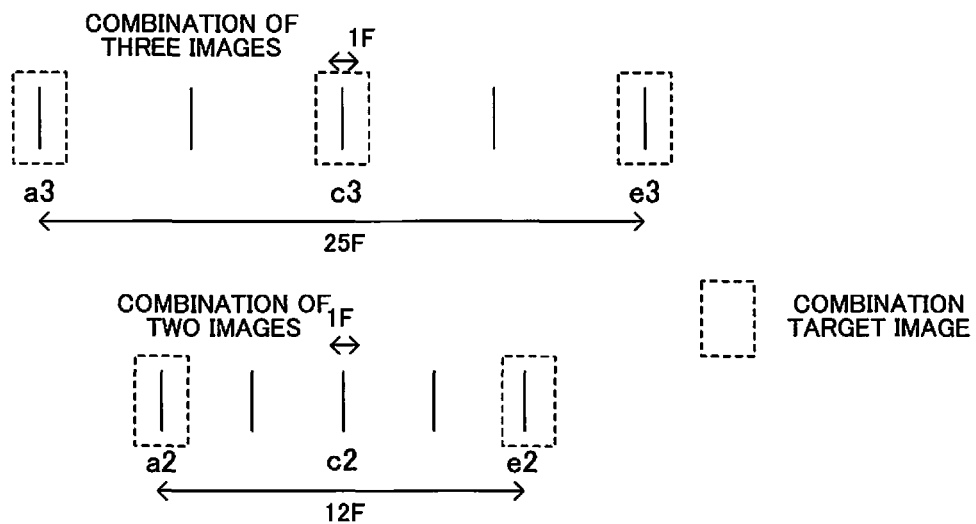

Also, in a case where the display image is switched from the combined image for display to the image for display, the above mentioned display image determination section determines a plurality of images used in generating a combined image for display in accordance with difference amount between focus positions of both ends set by the in focus position setting section (refer to FIG. 7C, for example).

The image generating section 117 has an image processing circuit, and applies image processing for live display and for storage to image data that has been acquired by the image sensor 103, to generate image data for live display and for storage. Image data for normal live view display is generated by the image generating section 117 applying image processing to a single frame of image data from the image sensor 103 every time it is input, and this image data is output to the display section 143. Also, when a shooting command has been issued (release button of the operation section 133 is pressed down fully) image data for storage is generated by the image generating section 117 applying image processing to image data of a single frame from the image sensor 103 that has been acquired, and this image data is stored in the storage medium 141. The image generating section 117 functions as an image processing circuit that generates an image for display from images that have been acquired by the image sensor.

The combined image generating section 119 has an image combining circuit, and generates image data used for display or storage by combining a plurality of images that have been acquired by the image sensor 103 by image processing. In the event that focus stacking mode has been set, it is possible to generate an image having a deeper depth of field than a normal single image by combining a plurality of images of different focus positions. Specifically, the combined image generating section 119 carries out alignment on a plurality of image data that have been taken at a plurality of focus positions, extracts regions of high sharpness (contrast) of the images, and generates image data of a deeper depth of field having a different depth of field than a single image by combining the high sharpness regions.

The combined image generating section 119 functions as a image combining circuit that generates a combined image for display that has a deeper depth of field than an image for display from a plurality of images for combination that have been acquired by the image sensor at a plurality of respectively different in focus positions that have been set by the in focus position setting section. The combined image generating section 119 functions as a image combining circuit that generates a combined image for display using a plurality of images for combination that have been acquired by the imaging section at a plurality of respectively different in focus positions that have been set by the in focus position setting section.

The frame rate control section 121 includes a processor for controlling frame rate of the display section 143 (display control circuit), and the microcomputer 131 may implement functions of the frame rate control section 121. The frame rate control section 121 controls frame rate of images displayed on the display section 143 (refer to S9 in FIG. 2).

Figure 8A:
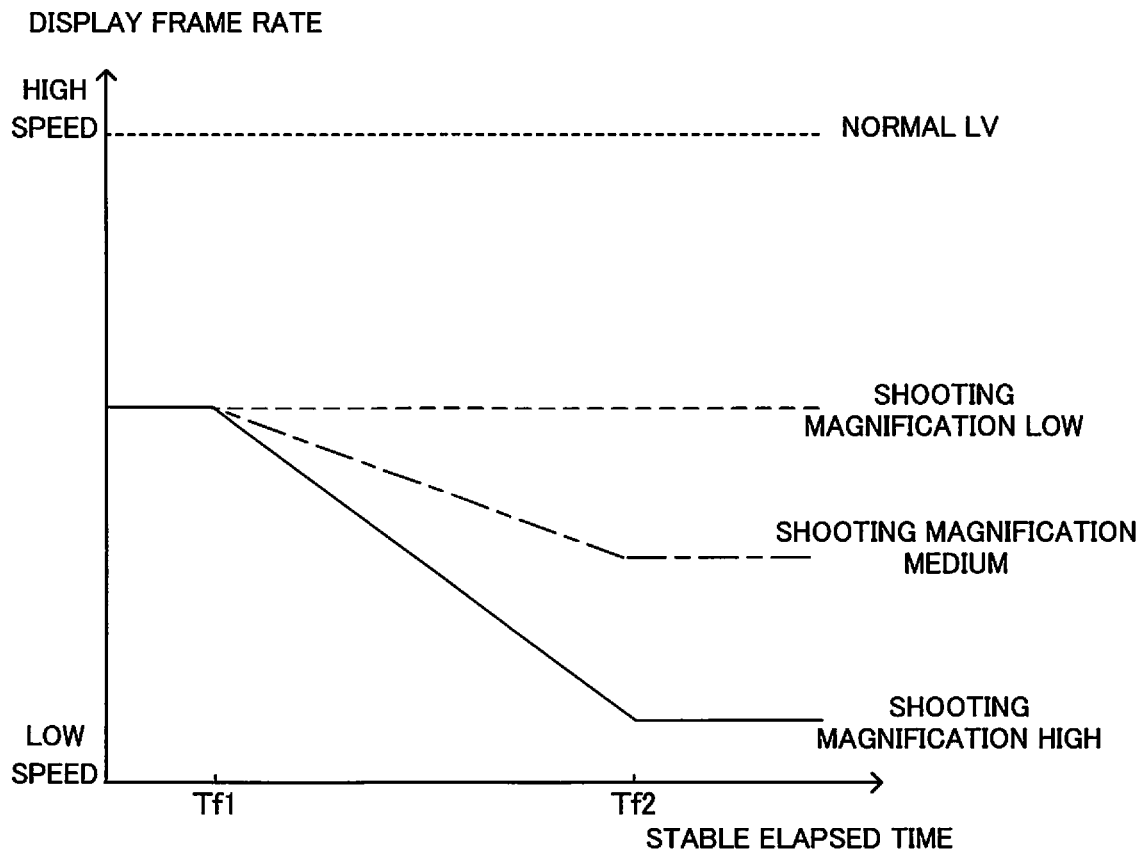
FIG. 8A and FIG. 8B are graphs showing control of frame rate, in the camera of one embodiment of the present invention.
Figure 8B:
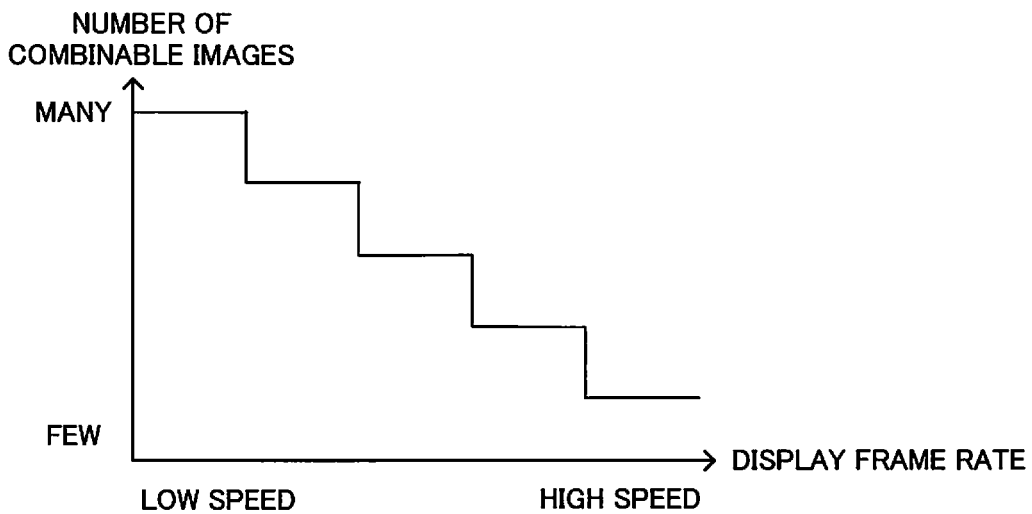

In the event that a combined image that has been generated by the combined image generating section 119 is displayed, then a low frame rate is set compared to when there is no combination (refer to FIG. 8A and FIG. 8B). Also, the frame rate control section 121 sets a lowest frame rate for control in accordance with shooting magnification at the time of shooting. In a case where shooting magnification is large, the lowest frame rate is set low compared to when shooting magnification is small. The frame rate control section 121 lowers frame rate in a case where change over time in information acquired by the shooting information acquisition section 113 is monitored and the information is stable (refer, for example, to FIG. 8A and FIG. 8B).

The frame rate control section 121 functions as a display control circuit that controls frame rate for display on the display section. This display control circuit changes a lowest frame rate for a combined image for display in accordance with shooting magnification at the time of shooting (refer, for example, to FIG. 8A). If there is no change in shooting information, the display control circuit lowers frame rate for display on the display section in a stepwise manner with the lowest frame rate as a lower limit value (refer, for example, to FIG. 8A). The frame rate control section increases a number of combination images to be combined by the image combining circuit in accordance with lowering of the frame rate for display on the display section (refer, for example, to FIG. 8B).

The microcomputer 131 has a CPU (Central Processing Unit), and peripheral circuits and memory etc. for the CPU. The microcomputer provides a function as a control section for this entire camera, and performs overall control of various sequences of the camera in accordance with programs stored in the flash memory 135. Besides the previously described I/F 199, an operation section 133 is connected to the microcomputer 131.

It should be noted that some or all of the previously described in focus position setting section 111, shooting information acquisition section 113, display image determination section 115, and frame rate control section 121 may be implemented as individual hardware circuits, but as described previously may also be implemented in software using the microcomputer 131 and peripheral circuits. In the event that the microcomputer 131 functions as an in focus position setting section, in focus positions are set. Also, when the microcomputer 131 functions as a shooting information acquisition section, information on shooting condition is acquired. Also, if the microcomputer 131 functions as a display image determination section, it is determined which of an image for display and a combined image for display is displayed as a display image. Also, in the event that the microcomputer 131 functions as a frame rate control section, the microcomputer 131 controls frame rate for display on the display, and changes a lowest frame rate for the combined image for display in accordance with shooting magnification at the time of shooting.

The operation section 133 is an interface for input of user commands to the camera body 100. The operation section 133 has operation members such as various input buttons, like a power supply button, shooting command burton (release button), a movie button, playback button, menu button, cross-shaped key, and OK button, and various input keys, and a touch panel etc., detects operating states of these operation members, and outputs the result of detection to the microcomputer 131. The microcomputer 131 executes various sequences according to user operation based on the result of detection of the operation members from the operation section 133. The power supply button is an operation member for instructing to turn a power supply of the digital camera on or off. If the power supply button is pressed, the power supply of the digital camera is turned on, and if the power supply button is pressed once again the power supply of the digital camera is turned off.

The shooting command button (release button) is a button for instructing shooting, made up of a first release switch that turns on when the button is pressed down half way, and a second release switch that is turned on when the button is pressed down further from the half-pressed state to be pressed down fully. The microcomputer 131 executes shooting preparation sequences such as an AE operation and AF operation, to perform preparation for shooting if the first release switch is turned on. Also, if the second release switch is turned on the microcomputer 131 performs shooting by executing a series of shooting sequences to control the mechanical shutter 101 etc., acquire image data based on a subject image from the image sensor 103 etc., and store this image data in the storage medium 131, in order to perform shooting (actual exposure).

The menu button is an operation button for causing display of menu screens on a display panel 145. It is possible to carry out the various camera settings on the menu screens. As camera setting there is, for example, combination mode, such as focus stacking, and as combination mode, besides focus stacking there may also be modes such as high dynamic range combination processing (HDR combination processing) and super resolution combination. Also, at the time of focus stacking mode, at the time of live view display, it may be made possible to set focus stacking display mode to display an image that has been subjected to focus stacking processing.

The flash memory 135 stores a program for executing the various sequences of the microcomputer 131. The microcomputer 131 performs overall control of the camera based on this program. The flash memory 135 is comprised of a non-volatile memory, which is electrically rewritable memory used by the microcomputer 131.

The SDRAM 137 is an electrically rewritable volatile memory for temporary storage of image data etc. This SDRAM 137 temporarily stores image data that has been output from the A/D conversion section 107, and image data that has been processed in the image generating section 117 and the combined image generating section 119 etc.

The compression and expansion section 138 has an image compression circuit and an image expansion circuit. At the time of storage of image data to the storage medium 141, the compression and expansion section 138 subjects image data that has been readout from the SDRAM 137 to compression in accordance with various compression formats such as JPEG compression in the case of a still image or MPEG in the case of a movie. The compression and expansion section 138 also performs expansion of JPEG image data and MPEG image data for image playback display. In the expansion of image data, a file that is stored in the storage medium 141 is read out, and after being subjected to expansion processing the image data is temporarily stored in the SDRAM 137.

A memory I/F 139 is connected to the storage medium 141, and carries out control for reading and writing of data such as image data and headers attached to image data to and from the storage medium 141. The storage medium 141 is a storage medium such as a memory card that can be loaded into and taken out of the camera body 100, for example, but this is not limiting and it may also be a hard disk or the like built into the camera body 100.

The display section 143 has a display panel, is arranged on a rear surface of the camera body 100, and performs image display. As a display panel it is possible to adopt various display panels such as a liquid crystal display panel (LCD, TFT), or organic EL etc. It is also possible to have a type of display panel that can be observed though an eyepiece, such as an electronic viewfinder (EVF).

As image display of the display section 143, there are Quickview Display for displaying stored image data for only a short time, playback display of image files for still images and movies that have been stored in the storage medium 141, and movie display such as live view display. It is also possible to display menu screens on the display section 143, and it is possible to perform setting of the above described focus stacking mode and focus stacking display mode etc.

At the time of live view display, when focus stacking mode and focus stacking display mode have been set, if it is determined by the display image determination section 115 that given shooting conditions are satisfied, an image resulting from focus stacking is displayed (refer to S5 and S7 in FIG. 2). The display section 143 functions as a display that displays a display image that has been determined by the display image determination section.

Next, using the flowchart shown in FIG. 2, description will be given of processing of the camera of this embodiment, particularly live view display, centering on a case where focus stacking mode has been set. It should be note that the flowchart shown in FIG. 2 is executed by the microcomputer 131 controlling each section in accordance with programs stored in the flash memory 135.

The flow shown in FIG. 2 starts operation when the power switch is turned on, as a result of the user operating the operation section 133. It should be noted that start of operation is not limited to the power switch being turned on, and the flow of FIG. 2 may be started at another time, such as when the release button for instructing shooting preparation of the camera is pressed down halfway, or a touch operation has been performed on the display section 143 with a touch panel. Also, the flow of FIG. 2 may be stopped as a result of the user operating the operation section 133.

If the flow shown in FIG. 2 is started, the microcomputer 131 first determines whether or not it is image combination mode (S1). The user can set an image combination mode such as focus stacking mode etc. on a menu screen. In this step, the microcomputer 131 determines whether or not the focus stacking mode is set.

If the result of determination in step S1 is that image combination mode (focus stacking mode) is set, the microcomputer 131 instructs acquisition of shooting information (S3). Here, the shooting information acquisition section 113 acquires various shooting information, such as brightness, subject color, light source color, subject movement, hand shake or device shake, focus position, focal length and photographer instruction etc. The shooting information acquired here is temporarily stored, for use in determination when image data of the next frame has been acquired.

If shooting information has been acquired, next determination of display image is performed (S5). Here, the display image determination section 115 determines whether to display a combined image or to display an image that has not been combined, using previous and current shooting information that was acquired in step S3. Details of this determination will be described later using FIG. 4, FIG. 5 and FIG. 8, but in summary, a difference between shooting information that was acquired previously (for example, one frame before) and shooting information that has been acquired this time is detected, and if this difference is within a predetermined threshold value it is determined that a combined image will be generated and displayed. On the other hand, if the detected difference exceeds the threshold value it is determined to generate and display a normal live view image without generating a combined image. In a case where image combination mode is set, when performing live view display before actual shooting (actual exposure), there is the advantage that it is possible to confirm a combined image in advance. However, in a case where change to shooting information is large, it is not suitable to generate a combined image. Therefore, it is determined, based on the shooting information, whether to display a normal live view image or to display a combined image.

If determination of a display image has been performed, the microcomputer 131 next determines whether or not to display a combined image (S7). Here, determination is based on the result of the processing in step S5. It should be noted that if focus stacking mode has been set also, whether or not to display an image resulting from having performed focus stacking may be set by the user. In this case, at the time of the determination in step S7, the microcomputer 131 performs determination by detecting whether or not focus stacking display has been set by the user. For example, the microcomputer 131 may determine whether focus stacking display mode has been set using a menu, and besides this, in a case where there is focus stacking display only while a given input button is being pressed down, the microcomputer 131 may perform determination based on whether that given input button is being pressed down.

If the result of determination in step S7 is to display a combined image, frame rate control is performed (S9). Here, the frame rate control section 121 controls frame rate of display on the display section 143. When a combined image is displayed on the display section 143, the frame rate control section 121 sets display frame rate lower than for a case of displaying a normal live view image. Also, under high shooting magnification conditions, if the frame rate control section 121 compares shooting information that was acquired by the shooting information acquisition section 113 with shooting information that was acquired previously and determines shooting conditions to be stable, a lower display frame rate is set. In a case where a normal live view image is displayed, and not a combined image, the frame rate control section 121 makes display frame rate the same as for when it is not image combination mode. This will be described in detail later using FIG. 8A and FIG. 8B.

If frame rate control has been performed, next generation of a combined image is performed (S11). Here, the in focus position setting section 111 sequentially moves the photographing lens 201 to a plurality of different in focus positions, and performs shooting at the respective in focus positions to acquire a plurality of image data. Setting of these in focus positions will be described later using FIG. 3. If a plurality of image data have been acquired, the combined image generating section 119 applies combination processing to this plurality of image data. Combination processing (focus stacking processing) to obtain an effect as if a depth of field has been enlarged can be realized by aligning positions of a plurality of images, and extracting and combining high frequency components of each image.

If the result of determination in step S1 is that image combination mode has not been set, or if the result of determination in step S7 is that combined image display is not performed, image generation is performed (S17). Here, image processing is applied to images that have been acquired by the image generating section 117. The image processing here is white balance, color matrix, edge enhancement, gamma conversion, noise reduction etc.

If a combined image has been generated in step S11, or if image generation has been performed in step S17, image display is next performed (S13). Here, a normal live view display image that was generated by the image generating section 117, or a combined image that was generated by the combined image generating section 119, is displayed on the display section 143. Frame rate at the time of display is the same as the frame rate for acquisition of image data in the image sensor 103, in the case of performing normal live view display, and is a display frame rate that was set in step S9 in the case of displaying a combined image.

If image display has been performed, next the microcomputer 131 determines whether or not to terminate live view (LV) display (S15). Live view display is terminated in cases such as when a shooting instruction button (release button) of the operation section 133 has instructed shooting (been pressed down fully), when the power supply button has been operated and power supply turned off, or when there has been no operation for a given time, etc. In this step the microcomputer 131 performs determination based on these operations. If the result of this determination is not to terminate live view, processing returns to step S1 and processing for live view continues. On the other hand, if the result of determination is to terminate live view, the microcomputer 131 terminates this flow.

In this way, with the flow for live view processing shown in FIG. 2, shooting information is acquired (S3), and whether to display a combined image or to display a normal live view image is determined based on this shooting information that has been acquired (S7). Specifically, in a case of conditions such as where a combined image can not be appropriately generated, generation of a combined image is stopped, while in a case of a situation where it is possible to appropriately generate a combined image it is possible to display an image that has been subjected to combination processing. This means that it is possible to prevent refresh interval for display at the time of live view display becoming unnecessarily long.

Figure 3:
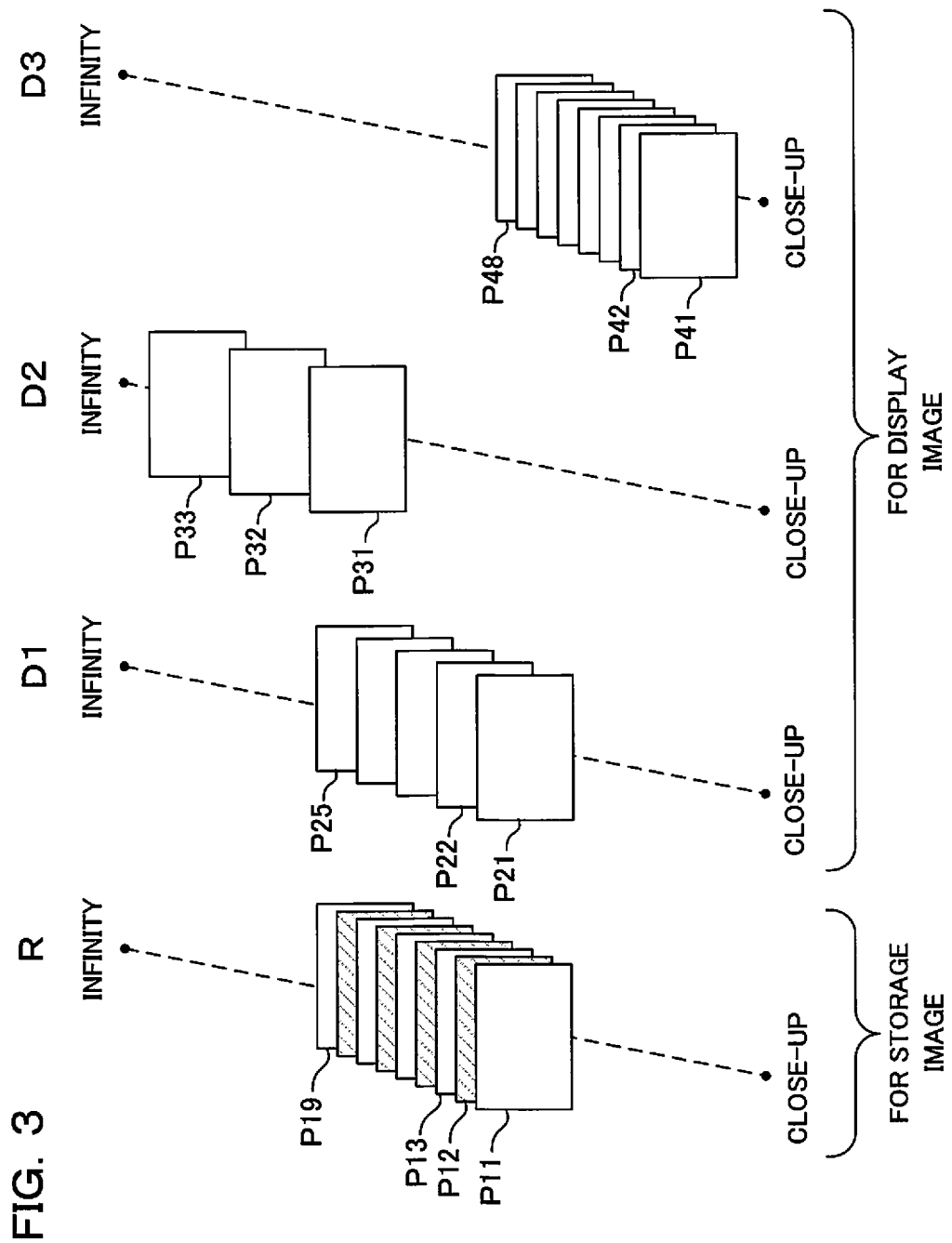
FIG. 3 is a drawing showing shooting position of images for focus stacking, in the camera of one embodiment of the present invention.

Next, setting of in focus positions will be described using FIG. 3. In the event that focus stacking mode has been set, a plurality of images used in generation of images for combination for depth of field extension are images that have been respectively taken at different focus positions. FIG. 3 shows an example of focus positions when shooting a plurality of different images.

In FIG. 3, images R represent focus positions of the photographing lens 201 in the case of shooting images for storage. With the example shown in FIG. 3, images R for storage are at nine positions, from focus positions P11 to P19, and nine images are taken. The combined image generating section 119 performs combination processing using these images that have been taken (9 images in the example shown in FIG. 3), and generates a combined image for storage.

Also, in FIG. 3, images D1 to D3 represent focus positions of the photographing lens 201 in the case of shooting images for display. With images D1, focus positions are at 5 locations, namely P21 to P25, with images D2, focus positions are at 3 locations, namely P31 to P33, and with images D3, focus positions are at 8 locations, namely P41 to P48, In this way, a number of images for display images may be made fewer than the number of images for storage images. In order to make the images fewer, focus positions where shooting for storage images is performed may be thinned, and these focus positions adopted as focus positions for display images. However, among the plurality of focus positions for shooting for storage images, a focus position closest to the infinity end and a focus position closest to the close up end are not thinned. This is because if images at these focus positions are thinned confirmation of depth of field range of the storage images will no longer be possible. It should be noted that images of the images R for storage that are hatched with diagonal lines represent images that have been thinned when shooting images D1 for display.

Thinning of images for display may involve taking the same number of images as for storage images and thinning at the time of combining images, or thinning at the time or shooting. However, if processing speed is considered, thinning is preferably performed at the time of shooting. A number of images to be thinned should be changed in accordance with display frame rate. In a case where it is desired that display frame rate be high, the number of images taken to be used in combination should be made fewer, and the number of images thinned made a lot. The lowest number of taken images is only images for focus positions that are closest to the infinity end and the close-up end, among the plurality of focus positions taken as images for storage. However, if a lot of images are thinned non-uniformity will arise in the combined image, and appearance quality of the combined image will drop. In order to maintain appearance quality the number of images that are thinned is preferably limited to about half the number of storage images. If priority is given to image appearance quality, the same number of images as for storage images may be used, without performing thinning. The number of taken images used in combination may be appropriately determined by determining a balance with processing speed.

Also, a number of taken images used in combination may be increased or decreased in accordance with shooting magnification. For example, in a case where shooting is performed for a subject at the infinity end with a low shooting magnification, since depth of field is deep even with a single image, it is possible to generate a pan-focus image with fewer combined images. On the other hand, in the case of shooting a subject at the close-up end with a high shooting magnification, depth of field with a single image is extremely shallow, and in order to achieve an effect of increasing depth of field many images are required.

Next, determination of shooting information and display images will be described using FIG. 4. FIG. 4 shows, in table form, an example of shooting information acquired by the shooting information acquisition section 113 and an example of stop and start conditions for display of a combined image determined by the display image determination section 115.

In FIG. 4, the leftmost column shows examples of shooting information acquired by the shooting information acquisition section 113. The two columns in the middle of FIG. 4 show conditions for a case when display of a combined image will be stopped by the display image determination section 115, when a combined image is being displayed.

The display image determination section 115 detects a change amount (difference) between shooting information that was acquired from a previous frame, and shooting information that has been acquired this time, that have been acquired by the shooting information acquisition section 113, and in the event that neither information has changed continues display of the combined image. If change arises in any shooting information, operation in accordance with the information that has changed is performed.

For shooting information of brightness, light source color, subject movement, hand shake or device shake, in the event that change amount (difference) in shooting information is small compared to a given value (less than or equal to a threshold value), the display image determination section 115 determines that display of the combined image be continued, without stopping combined image display. On other hand, if the change amount (difference) in shooting information is large (greater than a threshold value) the display image determination section 115 determines to stop display of the combined image.

Also, for shooting information of focus position, focal length and photographer instruction (combined image on/off instruction), if there is change in the shooting information the display image determination section 115 determines to stop display of the combined image regardless of change amount of the information. In this case, threshold value is effectively 0.

A threshold value used in the display image determination section 115 determining whether or not to stop display of a combined image may be changed in accordance with shooting conditions. For example, the threshold value may be changed in accordance with the state of shooting magnification at the time of shooting. It should be noted, regarding shooting magnification, that if focal length is made f, distance from the photographing lens to the subject is made s, and distance from the photographing lens to a focal plane is made s', a relationship $-(1/f)+(1/s')=-(1/s)$ is established, and shooting magnification m can be calculated using $m=-(s'/s)$.

Fluctuation in brightness, subject movement and hand shake or device shake becomes comparatively large in the case where shooting magnification is high compared to when shooting magnification is low. For this reason threshold values for these shooting conditions are set to larger values when shooting magnification is high than for when shooting magnification is low.

In FIG. 4, the rightmost column shows examples of conditions when display of the combined image is restarted by the display image determination section 115, when display of the combined image is stopped. For shooting information of brightness, light source color, subject movement, hand shake or device shake, after change amount for shooting information becomes small, and is stable, display of the combined image is restarted. Determination as to whether or not the situation is stable will be described later using FIG. 5. Also, for shooting information of focus position and focal length, if there is no longer any change in the shooting information, and there is an instruction to turn a combined image on as a photographer instruction (combined image on/off instruction), display of a combined image is restarted immediately.

In this way, with this embodiment, the time of switching a display image from an image for display (normal live view image) to a combined image for display (focus stacked image) is changed in accordance with type of shooting information. Specifically, in a case of shooting information such as brightness or light source color, the switch is made in accordance with change amount, while in the case of shooting information such as focus position or focal length the switch is made in accordance with there no longer being any change. It should be noted that shooting information being the basis for switching of timing is not limited to that exemplified in FIG. 4, and it is also possible to use other shooting information, and type of shooting information may be appropriately exchanged.

Next, change in shooting information and determination of display image will be described using FIG. 5. In FIG. 5, the upper part has shooting information represented on the vertical axis and passage of time represented on the horizontal axis. Also, the graph in the lower part of FIG. 5 shows whether a combined image will be displayed or a normal live view image will be displayed on the vertical axis. The shooting information on the vertical axis of the upper graph represents, for example, brightness, subject color, light source color, subject movement, hand shake or device shake, focus position, focal length and photographer instruction etc., and is a brightness value in the case of brightness, is a value for color etc. in the case of subject color and light source color, is a movement amount in the case of subject movement and hand shake or device shake, and in the case of focus position and focal length is whatever those values actually are. Also, Th represents threshold value.

In FIG. 5, initially (at time t0), a display image is made a combined image. At time t1, change amount of shooting information exceeds the threshold value Th, and the display image is switched to a normal live view image (normal image) after a slight delay time. Then, if a given time T has elapsed and time t2 is reached, it is considered that the shooting information has become stable, and the display image is switched to a combined image.

Further, if time t3 is reached, change amount of shooting information again exceeds the threshold value Th, and the display image is switched to a normal live view image (normal image) after a slight delay time. Then, if the given time T has elapsed and time t4 is reached, it is considered that the shooting information has become stable, and the display image is switched to a combined image. It should be noted that display when a combined image has been displayed, and display of a normal image is switched to, will be described later using FIG. 6.

In this way, with this embodiment whether or not to display a combined image is determined in accordance with change in current and previous shooting information. During combined image display (time t0 to t1, time t2 to t3), if there is no change in shooting information, or change amount is small and within a threshold value, combined image display continues. On the other hand, if change in shooting information is large, and change amount exceeds a threshold value (times t1, t3), combined image display is stopped. Also, during normal image display (time t1 to t2, time t2 to t3), if a given time T has elapsed with shooting information change amount staying small (within a threshold value) it is determined that the situation is stable, and combined image display is commenced. It should be noted that as was described previously, the threshold value may be changed in accordance with shooting magnification at the time of shooting.

Figure 6:
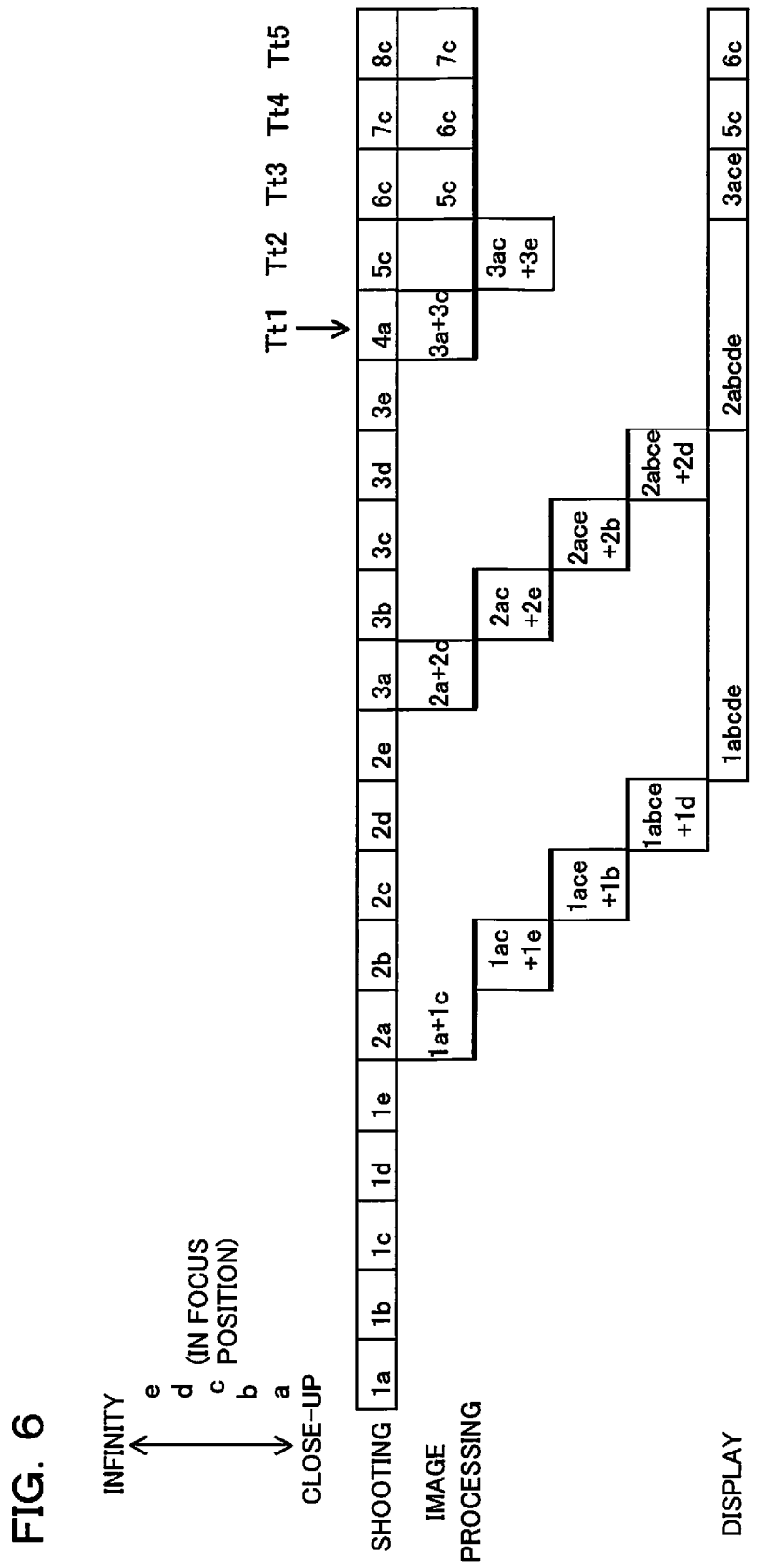
FIG. 6 is a drawing showing a display image after designation of display termination for a focus stacking image, in the camera of one embodiment of the present invention.

Next, a combination method for an image to be displayed on the display section 143 after display termination of a combined image has been instructed will be described using FIG. 6. The example shown in FIG. 6 is sequential movement to focus positions a to e, acquiring five different images at these focus positions, and sequentially combining these five images. Among the 5 focus positions, focus position c is made an in focus position, and two images are acquired toward the close-up end and two images are acquired toward the infinity end. With the example shown in FIG. 6, shooting is performed sequentially from the close-up end to the infinity end, but this is not limiting and shooting may also be performed from the infinity end to the close-up end, and shooting may also be performed in the order of combining.

1a, 1b, . . . 7c, 8c shown at an upper part of FIG. 6 represent taken images. For example, 1a represents a taken image at the position closest to the close-up end (position a) for a first combination period, 1c represents a taken image at position c for the first combination period, and 2e represents a taken image at the position closest to the infinity end (position e) for a second combination period.

1a+1c, 1ac+1e, . . . , shown in the middle area of FIG. 6, represent image processing applied to taken images. 1a+c represents performing focus stacking processing using taken image 1a and taken image 1c, while 1ac+1e represents performing focus stacking processing using combined image 1ac that resulted from focus stacking processing using taken image 1a and taken image 1c, and taken image 1e.

1abcde, 2abcde, 3ace, . . . , shown at the lower part in FIG. 6 represent display images. Display image 1abcde is an image that has been generated, in a first combination period, by combining five different images for focus positions a, b, c, d and e. With the example shown in FIG. 6, shooting for the next period is performed during combination processing, and for simplification shooting time for a single image and time for a single combination are made the same.

As was described previously, the display image determination section 115 instructs termination of display of a combined image when shooting conditions are irregular (S7 in FIG. 2, and times t1 and t3 in FIG. 5). After receiving instruction for display termination for a combined image, since some time is required until display of a normal image, at the time of display termination instruction for a combined image, if image combination is in the middle of being performed, that combined image is displayed.

For example, with the example shown in FIG. 6, at time Tt1 a combined image display termination instruction is issued, and at this time taken image 4a is being acquired. Next, at time Tt2, taken image 5c for normal live view display is acquired, image processing is applied to image 5c at time Tt3, and at time Tt4 it becomes possible to display normal live view image 5c. Then, if image combination is terminated for focus positions a, c and e, at time Tt3 image 3ace during combination is displayed as a combined image.

Among images for combined image creation, if combination for close-up end and infinity end is completed it is also possible to see the effect of enlarging depth of field, and also display of an image for the previous period may be continued until commencement of display of the next normal image, and it is possible to reduce display delay.

Next, a modified example of a combination method for an image to be displayed on the display section 143 after display termination of a combined image has been instructed will be described using FIG. 7A to FIG. 7C. With the example shown in FIG. 6, at the stage where an image that has been taken closest to the close-up end and an image that has been taken closest to the infinity end, and further three images that have been taken at in focus positions, among the plurality of images that have been acquired, have been combined, an image during combination was displayed. FIG. 7A to FIG. 7C are an example of a case where display delay is further reduced. With FIG. 7A and FIG. 7B, since processing prior to shooting at focus position 3e is no different to that in the example shown in FIG. 6, only operation after shooting for focus position 3e is illustrated.

As shown in FIG. 7A, at the stage of combining images that have been taken at position a closest to the close-up end and position e closest to the infinity end, among the plurality of images, an image while combination is in progress may be displayed. In this case, it is possible to confirm the effect after depth of field increase while reducing display delay.

Specifically, at time Tt11 a combined image display termination instruction is issued, and at this time a combined image 3a+3e is generated using the image 3a that was taken closet to the close-up end and image 3e that was taken closest to the infinity end. Then, at time Tt12 the generated combined image 3a+3e is displayed. If time Tt14 is reached it is possible to display a normal live view image using image 5c that was taken at time Tt12. Compared to the example shown in FIG. 6, it is possible to make the time at which a normal image for a single frame is displayed earlier, and it is possible to also confirm the effect of depth of field increase by displaying the combined image 3a+3e.

Besides the modified example shown in FIG. 7A, as shown in FIG. 7B, at the stage where an image for a central focus position c and an image for another focus position (here, an image for position a closest to the close-up end) have been combined, an image during combination may be displayed. In this case, it is possible to confirm focus conditions for in focus position and a partial effect of depth of field increase, while reducing display delay.

Specifically, at time Tt21 a combined image display termination instruction is issued, and at this time a combined image 3a+3c is generated using the image 3a that was taken at position a closest to the close-up end and image 3c that was taken at in focus position c. Then, at time Tt22 the generated combined image 3a+3c is displayed. If time Tt24 is reached it is possible to display a normal live view image using image 5c that was taken at time Tt22. Compared to the example shown in FIG. 6, similarly to the case of FIG. 7A, it is possible to make the time at which a normal image for a single frame is displayed earlier, and it is possible to estimate the effect of depth of field increase by analogical reasoning, by displaying the combined image 3a+3c.

Here, selection as to whether to display either the combined image that used two taken images, as was shown in FIG. 7A and FIG. 7B, or the combined image that used three taken images, as was shown in FIG. 6, as a combination in progress image, may be determined in accordance with focus position difference amount for images between focus positions closest to the close-up end and closest to the infinity end.

For example, as shown in FIG. 7C, if focus position a3 which is closest to the close-up end and focus position e3 that is closest to the infinity end are apart by more that a given threshold value, combination processing is performed using three taken images for focus position a3 closest to the close-up end, focus position e3 closest to the infinity end, and focus position c3, which is the in focus position, and this image is displayed as a combination in progress image. Also, if focus position a2 which is closest to the close-up end and focus position e2 that is closest to the infinity end are apart by less than a given threshold value, combination processing is performed using two taken images taken at focus position a2 closest to the close-up end and focus position e2 closest to the infinity end, or alternatively two taken images being one image taken at either of these two focus positions and an image taken at an in focus position of focus position c2, and this image is displayed as a combination in progress image.

The above described focus position difference amount may use depth of field as a reference, for example. If focus position difference amount corresponding to a depth of field is made 1 F, then if, for example, difference amount exceeds 20 F, for example, three taken images are combined, while if 20 F is not exceeded two taken images are combined, and the resulting image is made a combination in progress image. In the example shown in FIG. 7C, a case where three taken images are combined is shown at the upper part, while a case where two taken images are combined is shown at the lower part. In FIG. 7C, at the upper part a focus position difference amount for images that have been taken closest to the close-up end and closest to the infinity end is 25 F, and so combination processing is applied using images that have been taken closest to the close-up end, closest to the infinity end and at the in focus position. On the other hand, in the lower part a focus position difference amount for images that have been taken closest to the close-up end and closest to the infinity end is 12 F, and so combination processing is applied using images that have been taken at focus positions closest to the close-up end and closest to the infinity end.

This threshold value of 20 F may be adjusted in accordance with resolution of the display image for the display section 143. If resolution becomes small, apparent depth of field will become deeper, and so the threshold value may be set to a value larger than 20 F. For example, if a combined image display termination instruction is received before shooting at focus position 3e that is closest to the infinity end, a combined image resulting from images at focus positions 3a and 3c may be displayed as a combination in progress image.

Next, control of display frame rate corresponding to shooting magnification will be described using FIG. 8A and FIG. 8B. With this embodiment, during display of a combined image, as fluctuation in various shooting information becomes stable, a number of display frames that are displayed for 1 second, a so-called display frame rate, is adjusted. Specifically, if there is no change in shooting information, frame rate for display on the display section 143 is lowered in a stepwise manner with the lowest frame rate as a limit value. Display frame rate (number of frames/second) for an image for which combination is not being performed (a normal live view (LV) image) is 60 frames in one second for updating images. On the other hand, when displaying a combined image, time is required to perform image combination, the number of frames of an image displayed in one second becomes fewer, for example, about 10 frames in one second.

Also, with this embodiment, a lower limit value for display frame rate (number of frames/second) is set in accordance with shooting magnification. If shooting magnification is high, lower limit value for display frame rate is made lower, while if shooting magnification is low the lower limit value for display frame rate is made high. Lower limit value for display frame rate is calculated as a reciprocal of required combination time for combining a number of images for combination with still picture shooting. Required combination time corresponding to a number of images may be stored in advance. For example, if required time is 0.5 seconds, frame rate may be 2 frames per second.

Display frame rate for a combined image may be changed in accordance with a stable elapsed time that represents whether shooting conditions have been continuously stable, and shooting magnification. Specifically, display frame rate may be lowered gradually over time, without being lowered suddenly. With the example shown in FIG. 8A, from time Tf1 to time Tf2, display frame rate is lowered in accordance with shooting magnification. Then, once time Tf2 is reached, the display frame rate is made constant at the lower limit value corresponding to shooting magnification. This lower limit value for display frame rate becomes low speed (smaller) as shooting magnification becomes higher, as described previously. It should be noted that with the example shown in FIG. 8A, regardless of shooting magnification, at time Tf2 there is a transition to the lower limit value, but the time at which to transition to the lower limit value may be made different depending on shooting magnification.

In this way, when displaying a combined image that has been combined in a combination mode that was set at the time of live view display, as shooting information (shooting conditions) becomes stable display frame rate is lowered, and by combining a greater number of images it is possible to display an image of higher appearance quality. With the example shown in FIG. 8B, display frame rate is shown on the horizontal axis and number of combinable images is shown on the vertical axis. From this drawing it will be understood that if display frame rate is lowered (going in the left direction on the horizontal axis), the number of images that can be combined is increased.

In particular, if shooting magnification is high, then to display a higher appearance quality than when shooting magnification is low display frame rate may be lowered and more images combined. However, if display frame rate is lowered steeply framing becomes difficult. Therefore, display frame rate is preferably lowered gradually in accordance with stability of shooting information (shooting conditions). The number of combinations increases, and appearance quality of the combined image increases, in proportion to lowering of the display frame rate. The same number of display frames is maintained for a while regardless of shooting magnification, until the shooting information (shooting conditions) becomes stable.

As has been described above, with the one embodiment of the present invention, information on shooting conditions is acquired (S3), whether to make either an image for display or a combined image for display a display image that will be displayed is determined based on this shooting conditions information (S5), if the result of this determination is to display an image for display then a subject is imaged to acquire an image, and an image for display is generated from the image that has been acquired (S17), while if the result of determination is to display a combined image for display then an in focus position is set, a combined image for display having a greater depth of field than the image for display is generated from a plurality of images for combination that have been respectively acquired at the set plurality of different in focus positions (S11), and the display image that has been determined is displayed on a display section. As a result, framing conditions are accurately grasped based on shooting information, and by performing increase in depth of field in accordance with conditions it is possible to achieve confirmation of both framing and extended effect for depth of field.

Also, with the one embodiment of the present invention, when determining the display image, a display image to be displayed on the display section is determined using at least one item of information among brightness, light source color, subject movement, hand shake amount or device shake amount, focus position, focal length, and photographer instruction, that are acquired as shooting conditions. This means that it is possible to display an image for display, or display a combined image for display in accordance with shooting conditions such as brightness.

Also, with the one embodiment of the present invention, an shooting information acquisition section that acquired information on shooting conditions, and a display image determination section that determines whether to make either an image for display or a combined image for display a display image for display of an image based on the shooting conditions that have been acquired by this shooting information acquisition section, are provided. This means that, based on shooting conditions, in a case where a combined image can not be appropriately generated it is possible to display an image for display that has been generated from images acquired by an imaging section, and in a case where it is possible to appropriately generate a combined image it is possible to display a combined image for display. As a result, by accurately determining framing conditions and performing combination processing in accordance with conditions, it is possible to achieve confirmation of both framing and extended effect for depth of field.

It should be noted that with the one embodiment of the present invention, description has been given for a case of performing focus stacking processing as combination processing, but as combination processing this is not limiting, and may be processing for a super-resolution mode, high dynamic range (HDR) mode, a noise reduction mode or electronic shake prevention mode etc. In this case, at the time of performing live view display, and at the time of performing these combination processes, the shooting information acquisition section 113 may be made to acquire information that affects refresh interval.

With the one embodiment of the present invention, the in focus position setting section 111, shooting information acquisition section 113, display image determination section 115, frame rate control section 121 etc. have been configured separately from the microcomputer 131, but some or all of these sections may be configured in software, and implemented by a CPU within the microcomputer 131. Also, besides being constructed using hardware circuits and simple parts, the present invention may also be constructed in the form of software using a CPU and programs, or may be constructed in hardware such as gate circuitry generated based on a programming language described using Verilog, or may be comprised of circuits that utilize a DSP (digital signal processor). Suitable combinations of these approaches may also be used.

Also, with the one embodiment of the present invention, an instrument for taking pictures, in a state of either being held or being fixed, has been described using a digital camera, but as a camera it is also possible to use a digital single lens reflex camera, a mirror-less camera or a compact digital camera, or a camera for movie use such as a video camera, and further to have a camera that is incorporated into a mobile phone, a smartphone, a mobile information terminal, personal computer (PC), tablet type computer, game console etc., or a camera for medical use, a camera for mounting on a vehicle, a surveillance camera, or a camera for an optical unit that is configured to adjust in focus position by adjusting a distance between a objective lens and a stage on which a subject is fixed, such as a digital microscope. In any event, it is possible to apply the present invention as long as it is a device or software for shooting that subjects a plurality of images to combination processing.

Also, among the technology that has been described in this specification, with respect to control that has been described mainly using flowcharts, there are many instances where setting is possible using programs, and such programs may be held in a storage medium or non-volatile memory. The manner of storing the programs in the storage medium or non-volatile memory may be to store at the time of manufacture, or by using a distributed storage medium, or they be downloaded via the Internet.

Also, with the one embodiment of the present invention, operation of this embodiment was described using flowcharts, but procedures and order may be changed, some steps may be omitted, steps may be added, and further the specific processing content within each step may be altered. It is also possible to suitably combine structural elements from different embodiments.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An imaging device comprising:
an image sensor that forms a subject image to acquire an image;
an image processing circuit that generates an image for display from images that have been acquired by the image sensor;
an image combining circuit that generates a combined image for display that has a deeper depth of field than the image for display, from a plurality of images for combination that have been acquired by the image sensor at respectively different in focus positions; and
a processor having an in focus position setting section, a shooting information acquisition section and a display image determination section, the in focus position setting section setting in focus position, the shooting information acquisition section acquiring information on shooting conditions, and the display image determination section determining whether to display either the image for display or the combined image for display as a display image,
wherein
the image combining circuit generates a combined image for display using a plurality of images for combination that have been acquired at a plurality of in focus positions that have been set by the in focus position setting section,
the display image determination section determines the display image to be displayed using at least one of items of information among brightness, light source color, subject movement, and blur amount, focus position, focal length and photographer instruction acquired by the shooting information acquisition section,
the display image determination section determines an image to be displayed on the display by comparing change amount in previous and current information, of information that has been acquired by the shooting information acquisition section, with a threshold value, and the display image determination section changes the threshold value in accordance with shooting magnification at the time of shooting.

2. The imaging device of claim 1, wherein
the display image determination section changes timing for switching a display image from the image for display to the combined image for display in accordance with a type of information for which change amount of the information has exceeded the threshold value.

3. The imaging device of claim 1, further comprising:
a display that displays the display image that has been determined by the display image determination section,
wherein when the display image determination section switches the display image from the combined image for display to the image for display, if the combined image generating section has completed combination of at least two images from among images for combination, the display image determination section determines a combined image during combination as the display image, and after this image has been displayed on the display determines an image for display as a display image and switches so as to display this image on the display.

4. The imaging device of claim 3, wherein
when the display image determination section switches the display image from the combined image for display to the image for display, if the combined image generating section has completed combination of images for focus positions at both ends that have been set by the in focus position setting section, from among the images for combination, the display image determination section determines a combined image during combination as the display image, and after this image has been displayed on the display determines the image for display as the display image and switches so as to display this image on the display.

5. The imaging device of claim 4, wherein
when the display image is switched from the combined image for display to the image for display, the display image determination section determines a number of images used in generating the combined image for display in accordance with difference amount between focus positions of both ends set by the in focus position setting section.

6. An imaging device comprising:
an image sensor that forms a subject image to acquire an image;
an image processing circuit that generates an image for display from images that have been acquired by the image sensor;
an image combining circuit that generates a combined image for display that has a deeper depth of field than the image for display, from a plurality of images for combination that have been acquired by the image sensor at respectively different in focus positions;
a processor having an in focus position setting section, a shooting information acquisition section and a display image determination section, the in focus position setting section setting in focus position, the shooting information acquisition section acquiring information on shooting conditions, and the display image determination section determining whether to display either the image for display or the combined image for display as a display image;

a display that displays the display image that has been determined by the display image determination section; and a display control circuit that controls frame rate of display on the display, wherein the display control circuit changes a lowest frame rate for a combined image for display in accordance with shooting magnification at the time of shooting.

7. The imaging device of claim 6, wherein if there is no change in the shooting information, the display control circuit lowers frame rate for display on the display section in a stepwise manner with the lowest frame rate as a threshold value.

8. The imaging device of claim 7, wherein a number of images combined by the image combining circuit increases in accordance with lowering of the frame rate for display on the display.

9. An imaging method comprising:

imaging a subject and acquiring images;

generating an image for display from the images that have been acquired;

setting in focus position;

generating a combined image for display that has a deeper depth of field than the image for display from a plurality of images for combination that have been acquired at a plurality of respectively different in focus positions that have been set, acquiring information on shooting conditions;

determining whether to make either the image for display or the combined image for display a display image that is displayed; and in determining the display image, determining the display image that is displayed on the display using at least one of items of information among brightness, light source color, subject movement, and blur amount, focus position, focal length and photographer instruction acquired as the shooting conditions that have been acquired, wherein when determining the display image, determining an image to be displayed by comparing change amount in previous and current information, of the shooting information that has been acquired, with a threshold value, and when determining the display image, changing the threshold value in accordance with shooting magnification at the time of shooting.

10. The imaging method of claim 9, wherein when determining the display image, changing timing for switching the display image from the image for display to the combined image for display in accordance with a type of information for which change amount of the shooting information has exceeded the threshold value.

11. The imaging method of claim 9, further comprising:

displaying the display image that has been determined on a display, wherein in determining the display image, when the display image is switched from the combined image for display to the image for display, if combination has been completed for at least two images from among the images for combination, determining a combined image during combination as the display image, and after this image has been displayed on the display, determining the image for display as the display image and switching performing switching so as to display this image on the display.

12. The imaging method of claim 11, wherein in determining the display image, when the display image is switched from the combined image for display to the image for display, if combination has been completed for images for focus positions at both ends that have been set by an in focus position setting section, from among the images for combination, determining a combined image during combination as the display image, and after this image has been displayed on the display determining the image for display as the display image and performing switching so as to display this image on the display.

13. The imaging method of claim 12, wherein in determining the display image, when the display image is switched from the combined image for display to the image for display, determining a number of images used in generating the combined image for display in accordance with difference amount between both ends that have been set.

14. An imaging method comprising:

imaging a subject and acquiring images;

generating an image for display from the images that have been acquired;

setting in focus position;

generating a combined image for display that has a deeper depth of field than the image for display from a plurality of images for combination that have been acquired at a plurality of respectively different in focus positions that have been set;

acquiring information on shooting conditions, determining whether to make either the image for display or the combined image for display a display image that is displayed;

displaying the display image that has been determined on a display; and in determining the display image, determining the display image that is displayed on the display using at least one of items of information among brightness, light source color, subject movement, and blur amount, focus position, focal length and photographer instruction acquired as the shooting conditions that have been acquired, wherein when displaying the combined image for display on the display, changing the lowest frame rate for the combined image for display in accordance with the shooting magnification.

15. The imaging method of claim 14, wherein if there is no change in the shooting information, lowering the frame rate for display on the display section in a stepwise manner with the lowest frame rate as a threshold value.

16. A non-transitory computer-readable medium storing a processor executable code, which when executed by at least one processor, performs an imaging method, the imaging method comprising:

imaging a subject and acquiring images;

generating an image for display from the images that have been acquired;

setting in focus position;

generating a combined image for display that has a deeper depth of field than the image for display from a plurality of images for combination that have been acquired at a plurality of respectively different in focus positions that have been set;

acquiring information on shooting conditions;

determining whether to make either the image for display or the combined image for display a display image that is displayed;

displaying the display image that has been determined on a display; and in determining the display image, determining the display image that is displayed on the display using at least one of items of information among brightness, light source color, subject movement, and blur amount, focus position, focal length and photographer instruction acquired as the shooting conditions that have been acquired, wherein when determining the display image, determining an image to be displayed by comparing change amount in previous and current information, of the shooting information that has been acquired, with a threshold value, and when determining the display image, changing the threshold value in accordance with shooting magnification at the time of shooting.

17. A non-transitory computer-readable medium storing a processor executable code, which when executed by at least one processor, performs an imaging method, the imaging method comprising:

imaging a subject and acquiring images;

generating an image for display from the images that have been acquired;

setting in focus position;

generating a combined image for display that has a deeper depth of field than the image for display from a plurality of images for combination that have been acquired at a plurality of respectively different in focus positions that have been set;

acquiring information on shooting conditions;

determining whether to make either the image for display or the combined image for display a display image that is displayed;

displaying the display image that has been determined on a display; and in determining the display image, determining the display image that is displayed on the display using at least one of items of information among brightness, light source color, subject movement, and blur amount, focus position, focal length and photographer instruction acquired as the shooting conditions that have been acquired, wherein when displaying the combined image for display on the display, changing the lowest frame rate for the combined image for display in accordance with the shooting magnification.

* * * * *